Nov. 11, 1969          W. H. ROBISON          3,477,181
TOMBSTONE FRAMES
Filed Nov. 27, 1967

INVENTOR
William H. Robison his attorneys

3,477,181
TOMBSTONE FRAMES
William H. Robison, Madera, Pa., assignor to Robison Corporation, a corporation of Pennsylvania
Filed Nov. 27, 1967, Ser. No. 685,775
Int. Cl. E04h *13/00;* E04f *19/02*
U.S. Cl. 52—27
4 Claims

ABSTRACT OF THE DISCLOSURE

A tombstone frame made up of an adjustable rectilinear member having an opening slidably fitting over a tombstone and engaging the base periphery thereof and having an outer periphery spaced from said opening and having a relatively thin edge contacting the earth to substantially eliminate the access of light to the earth thereunder. The frame includes size adjusting structure, ground anchoring means and means at the base to support receptacles.

---

This invention relates to tombstone frames and particularly to a removable frame to be placed around a tombstone to permit mowing of grass with a mechanical mower and to completely eliminate hand trimming.

One of the greatest problems in cemeteries is that of keeping the grass neatly cut and trimmed, particularly in areas where labor is scare and expensive. This problem is created by the presence of tombstones and monuments and the fact that ordinary mowers cannot come closer than about four inches from the base of such tombstones and monuments thus leaving a band of uncut grass or vegetation which must be trimmed by hand. This is both time consuming and expensive. It is the kind of job that is not readily filled and usually not well done with the result that cemeteries are frequently unkempt and unattractive in appearance.

I have invented a tombstone frame which eliminates these problems and makes the maintenance of cemeteries much less burdensome. My invention makes it possible to mow around tombstones and monuments with ordinary hand or power mowers without the need for hand trimming. This saves both time and money and solves the problem of cemetery maintenance.

Preferably I provide a frame having an opening adapted to slidably engage the periphery of a tombstone, and protectively surround the tombstone. The frame having an outer periphery spaced generally uniformly from said opening, a generally flat bottom surface adapted to engage the earth around said tombstone and substantially eliminate access of light to the earth underlying the frame. A beveled or sloping upper surface sloping downwardly from the opening to the outer periphery. Preferably the frame is made of metal, plastic or like material in a rectilinear configuration, preferably with a resilient sealing strip surrounding an opening in the center engaging the tombstone or the frame may be made of a resilient material or elastomer such as rubber, neoprene and the like so that it will take the contour of the ground surrounding the tombstone and will engage the base of the tombstone when applied to provide a seal which will prevent the growth of vegetation between said base and frame. The frame may be made of formed metal, plastic or telescoping members in a rectilinear configuration. Preferably the underside of said frame is coated with a herbicide to provide added protection against undesirable growth of vegetation. The resilient engagement provided by the preferred forms of this invention is desirable because it effectively provides a continuous, light barrier which produces a light free section of earth underlying the frame. The light barrier, therefore, prevents vegetation from growing up between the frame and stone which would require hand trimming and would be equally as unsightly as the problem which it seeks to eliminate.

In the foregoing general statement of my invention I have set out certain objects, purposes and advantages. Other objects, purposes and advantages will be apparent from a consideration of the following description and the accompanying drawings in which.

Figure 1:
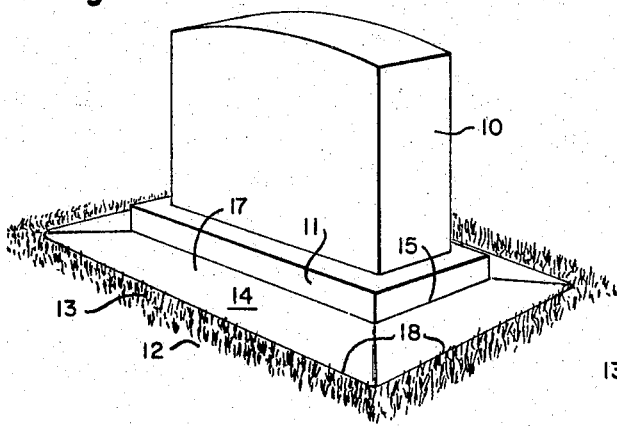
FIG. 1 is an isometric view of a tombstone and frame according to my invention.
Figure 2:
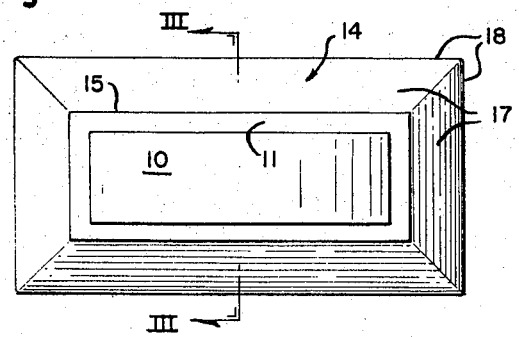
FIGURE 2 is a top plan view of the tombstone and frame of FIGURE 1.
Figure 3:
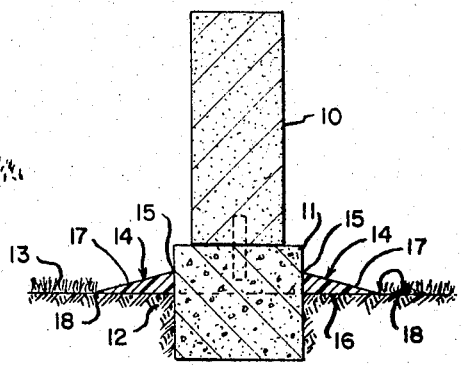
FIGURE 3 is a section on the line III—III of FIGURE 2.

Referring to the drawings I have illustrated a tombstone 10 having a base 11 surrounded by earth 12 and grass 13. A tombstone frame 14 has a generally rectangular outer periphery and defines a generally rectangular opening. The transverse width of each of the four sides is substantially equal and, therefore, the opening may be considered to be generally uniformly spaced from the outer periphery or positioned substantially symmetrically within the outer periphery. The frame 14 of neoprene surrounds the base 11 and resiliently engages the same along the edges of opening 15. The frame 14 is closed, four sided member and has a generally triangular transverse cross section. A flat bottom surface 16 of the frame 14 rests on the earth 12 immediately adjacent the base 11. The top surface 17 of the frame 14 slopes downwardly from the edge of the opening 15 to a knife edge 18 which forms the outer periphery of the frame which rests on the earth and defines the protected area. The sloping surface 17 is preferably of uniform slope around at least a major portion of the frame 14. This sloping upper surface 17 and knife edge 18 provides a surface upon which the wheel of a mower may run and over which the cutting blade will safely operate thus leaving a clean, trim surface and eliminating the need for hand trimming. A vertical surface which connects surfaces 16, 17 is in substantially continuous contact with the base 11 of tombstone 10.

Figure 4:
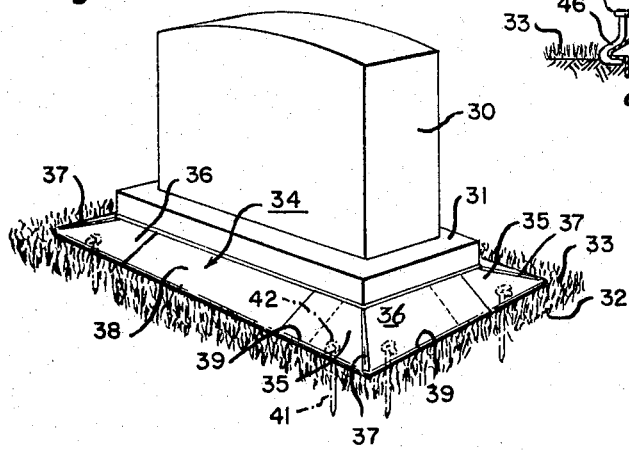
FIGURE 4 is an isometric view of a second embodiment of my invention.
Figure 5:
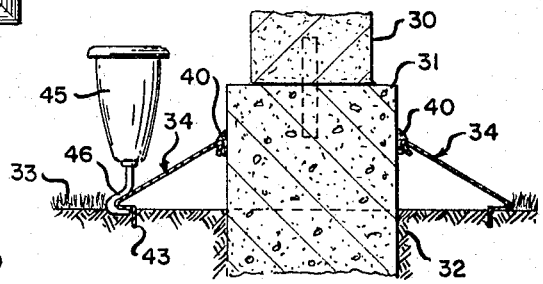
FIGURE 5 is a section of the form of tombstone frame illustrated in FIGURE 4, shown with a receptacle.

Referring to FIGURES 4 and 5, I have illustrated a second embodiment of my invention in which a tombstone 30 having a base 31 surrounded by earth 32 and grass 33 is provided with a frame 34 which in the frame illustrated is made of formed aluminum. Each of the four sides has a generally web or sheet-like cross sectional configuration over at least a major portion of the section between the edges of the opening and the outer periphery. Each side is made of two telescoping members 35 and 36, each of which is anodized or otherwise colored to a desired color. Each corner 37 provides a mitered connection between corner elements 35, 36. Each corner 37 is secured to each of the adjacent corners either directly or by means of a connector member 38. In FIGURE 4, the transverse sides of the frame 34 are established by securing members 36 of one corner directly to member 35 of an adjacent corner 37. The longitudinal sides of frame 34 are established by securing one end of connector 38 to corner element 35 and the other end of connector 38 to corner element 36 of the adjacent corner. In the form illustrated, securement is effected by slidingly engaging the edge of connector 38 into a groove 39 formed along the outer edge of members 35, 36. Grooves 39 are inwardly open, generally U-shaped troughs which are defined by re-entrantly inwardly directed bends in the edges of members 35, 36. A plastic resilient seal strip 40 is preferably inserted between the base 31 and the top edge of frame 34 to form a seal between the base and frame. With a frame 34 made of resilient material, the sealing strip 40 may be made of the same material as the frame. The resilient seal strip 40 provides a substantially continuous seal line disposed at a position spaced above the earth and extending substantially completely around the base 3 of the tombstone 30. Preferably hold down pins 41 (shown in chain line) are inserted through openings 42 (in chain line) in frame 34, although these may be omitted. A herbicide is preferably sprayed or otherwise applied to the undersurfaces of frame 34.

The bottom edge adjacent the outer periphery has a generally horizontal inwardly directed flange in underlying relationship with respect to the sloping wall portion of frame 34, which flange terminates in a generally downwardly directed depending flange 43 which enters the earth to form a bottom seal.

A receptacle or flower holder having a clip 46 which is secured to the holder 45 and to the frame member. The clip 46 extends inwardly under the outer periphery of the frame member and is in contact with flange 43.

While I have illustrated and described certain preferred embodiments of my invention in the foregoing specification it will be apparent to those skilled in the art that this invention may be otherwise embodied.

I claim:
1. In combination:
a tombstone having a base of substantially rectangular outer periphery,
a closed four-sided vegetation inhibiting frame member peripherally contacting said tombstone base,
said frame member having a continuous generally rectangular outer periphery and defining a generally rectangular tombstone base receiving opening disposed substantially symmetrically within said member,
said frame member having an upper inner sealing edge at said rectangular opening in peripheral contact with said tombstone base and an outer lower sealing edge at said outer periphery,
said frame member having a web portion inclined from said upper inner sealing edge downwardly and outwardly to said outer lower sealing edge and having an underlying vegetation free void,
a generally horizontal flange extending inwardly from said outer lower sealing edge in underlying relationship with respect to said web,
ground anchoring means maintaining said frame in sealing position, and
adjustment means for adjusting the size of said rectangular opening.
2. The combination of claim 1 wherein:
each said web portion being of substantially identical transverse configuration to provide a uniform difference in elevation between said continuous upper inner sealing edge and said continuous outer periphery,
said continuous upper inner sealing edge has a resilient sealing material adaped to compressively engage said tombstone base substantially continuously along said continuous sealing edge to provide substantially continuous sealing engagement between said frame member and said tombstone base; and
the remainder of said frame member composed of a substantially rigid material.
3. The combination of claim 2 including:
said ground anchoring means having a downwardly directed portion depending from said inwardly directed flange extending into the earth;
a receptacle supported by said frame member disposed adjacent to the outer periphery thereof;
receptacle anchoring means securing said receptacle to said frame member; and
sad receptacle anchoring means extending under the outer periphery of said frame member in contact with the underside of said inwardly directed flange.
4. The combination of claim 2, comprising:
said frame member having four mitered corners,
each said mitered corner connecting a corner element of one side of said frame with a corner element of an adjacent side of said frame;
each said side having a corner element at each end thereof; and
said adjustment means having connector members each with opposed ends slidingly engaged with said corner elements of one said side.

References Cited

UNITED STATES PATENTS

| | | | |
|---|---|---|---|
| 1,139,515 | 5/1915 | Haas | 52—102 |
| 1,226,743 | 5/1917 | Bowman | 52—217 |
| 1,712,801 | 5/1929 | White | 52—155 |
| 2,242,266 | 5/1941 | Scales | 52—101 |
| 1,130,545 | 5/1915 | Scott | 47—25 |
| 1,442,172 | 1/1923 | Nelson | 52—58 |
| 1,639,558 | 8/1927 | Frobish | 52—219 |
| 1,916,494 | 7/1933 | Schrickel | 52—102 |
| 1,931,602 | 10/1933 | Colman | 47—25 |
| 3,005,287 | 10/1961 | Dudley | 47—25 |

FOREIGN PATENTS

| | | |
|---|---|---|
| 765,148 | 8/1967 | Canada. |
| 930,921 | 7/1963 | Great Britain. |

HENRY C. SUTHERLAND, Primary Examiner

U.S. Cl. X.R.

47—33; 52—103, 155